United States Patent
Beaujard et al.

(10) Patent No.: US 11,499,439 B2
(45) Date of Patent: Nov. 15, 2022

(54) DOUBLE FLOW TURBOJET INCLUDING AN INTERMEDIATE FLOW PATH DEDICATED TO SUPPLYING WITH AIR VIA RADIAL ARMS AN EXHAUST CASING OF THIS TURBOJET

(71) Applicant: SAFRAN AIRCRAFT ENGINES, Paris (FR)

(72) Inventors: Antoine Jean-Philippe Beaujard, Moissy-Cramayel (FR); Tewfik Boudebiza, Moissy-Cramayel (FR); Catherine Pikovsky, Moissy-Cramayel (FR); Bastien Pierre Verdier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 53 days.

(21) Appl. No.: 16/483,526

(22) PCT Filed: Feb. 5, 2018

(86) PCT No.: PCT/FR2018/050275
§ 371 (c)(1),
(2) Date: Aug. 5, 2019

(87) PCT Pub. No.: WO2018/146405
PCT Pub. Date: Aug. 16, 2018

(65) Prior Publication Data
US 2020/0032664 A1   Jan. 30, 2020

(30) Foreign Application Priority Data
Feb. 7, 2017 (FR) ...................... 17 00128

(51) Int. Cl.
*F01D 9/06* (2006.01)
*F02C 7/18* (2006.01)
*F02K 3/077* (2006.01)
(Continued)

(52) U.S. Cl.
CPC ........... *F01D 9/065* (2013.01); *F01D 25/125* (2013.01); *F02C 6/08* (2013.01); *F02C 7/18* (2013.01);
(Continued)

(58) Field of Classification Search
CPC .................. F01D 9/065; F01D 25/125; F05D 2260/608; F02K 3/077; F02C 6/08; F02C 7/18
See application file for complete search history.

(56) References Cited

U.S. PATENT DOCUMENTS 7,614,210 B2 * 11/2009 Powell .................... F02K 3/075
                                                        60/226.3
9,797,312 B2 * 10/2017 Johnsson .................. F02C 7/20
(Continued)

FOREIGN PATENT DOCUMENTS

FR    2824598 A1   11/2002
FR    2897655 A1    8/2007
(Continued)

OTHER PUBLICATIONS

English machine translation of FR 2 824 598 A1, Feb. 26, 2021.*
Search Report issued in French Patent Application No. 17 00128 dated Dec. 1, 2017.
(Continued)

*Primary Examiner* — Christopher Verdier
(74) *Attorney, Agent, or Firm* — Pearne & Gordon LLP

(57) ABSTRACT

A double flow turbojet including:
 a low pressure compressor;
 a series of casings downstream of this low pressure compressor to delimit a primary flow path for circulating a primary stream, and including an upstream edge delimiting an inlet opening;
 a high pressure compressor in the primary flow path;
(Continued)

a shroud surrounding the series of casings to delimit a flow path for circulating an intermediate stream, and having an upstream edge delimiting a circular inlet opening situated upstream of the high pressure compressor;

a secondary flow path casing surrounding the shroud to delimit a secondary flow path for circulating a secondary stream;

an exhaust casing including radial arms collecting the air coming from the intermediate flow path.

6 Claims, 2 Drawing Sheets

(51) Int. Cl.
    *F02C 6/08*     (2006.01)
    *F01D 25/12*     (2006.01)

(52) U.S. Cl.
    CPC ........ *F02K 3/077* (2013.01); *F05D 2260/608* (2013.01)

(56) References Cited

U.S. PATENT DOCUMENTS

| | | | | |
|---|---|---|---|---|
| 2013/0177385 | A1* | 7/2013 | Munsell | F02C 7/28 |
| | | | | 415/1 |
| 2018/0195416 | A1* | 7/2018 | Jouy | F01D 25/30 |

FOREIGN PATENT DOCUMENTS

| | | | |
|---|---|---|---|
| GB | 695482 A | 8/1953 | |
| GB | 938247 A * | 10/1963 | ............ F01D 5/081 |
| WO | 2013165281 A1 | 11/2013 | |

OTHER PUBLICATIONS

International Search Report issued in Application No. PCT/FR2018/050275 dated May 25, 2018.

Written Opinion issued in Application No. PCT/FR2018/050275 dated May 25, 2018.

* cited by examiner

DOUBLE FLOW TURBOJET INCLUDING AN INTERMEDIATE FLOW PATH DEDICATED TO SUPPLYING WITH AIR VIA RADIAL ARMS AN EXHAUST CASING OF THIS TURBOJET

This is the National Stage application of PCT international application PCT/FR2018/050275, filed on Feb. 5, 2018 entitled "TURBOFAN COMPRISING AN INTERMEDIATE STREAM FOR THE SUPPLY OF AIR VIA RADIAL ARMS TO AN EXHAUST HOUSING OF SAID TURBOFAN", which claims the priority of French Patent Application No. 17 00128 filed Feb. 7, 2017, both of which are incorporated herein by reference in their entirety.

TECHNICAL FIELD

The invention relates to the supply with air via radial arms of an exhaust casing equipping a double flow turbojet.

PRIOR ART

A double flow turbojet comprises an intake duct receiving air that is sucked in by a low pressure compressor to next be divided into a central primary stream and a secondary stream surrounding the primary stream.

The secondary stream circulates in a space called secondary flow path which is delimited externally by a secondary flow path casing also called engine fairing, and internally by an envelope surrounding the primary stream.

The primary stream circulates in a space called primary flow path delimited externally by the envelope and internally by a succession of fixed and rotating internal elements. The fixed internal elements include platforms of straightening vanes and distributors, and inner casing shells, and the rotating internal elements include platforms of bladed wheels of rotors.

Complementarily, purges blow the air from the inner regions to the primary flow path, through each space longitudinally separating a fixed internal element and a rotating internal element. These purges ensure that the hot air of the primary flow path does not enter into colder inner regions.

More specifically, the primary stream circulates between an inner casing and an outer casing of a high pressure compressor to be compressed in this high pressure compressor before being burned in a combustion chamber. It is next expanded in a high pressure turbine to drive the high pressure compressor, then in a low pressure turbine to drive the low pressure compressor, before being expulsed rearwards while generating thrust.

The envelope delimiting externally the primary flow path is thereby formed by a series of casings including a high pressure compressor casing, a casing at the level of the combustion chamber and a high pressure turbine casing, as well as by an exhaust casing outer shell.

Each turbine and each compressor is formed of stages each comprising a series of rotating blades regularly spaced around a central longitudinal axis of the engine, optionally preceded by a distributor in the case of a turbine or optionally followed by a straightening vane in the case of a compressor. The distributors and the straightening vanes are constituted of a series of fixed blades.

The rear part of such an engine includes, downstream of the low pressure turbine, an exhaust casing, usually designated by the acronym TRF (Turbine Rear Frame), which bears a bearing supporting a rear rotor end of the engine.

This exhaust casing comprises an inner shell and an outer shell and radial arms making these shells integral with one another, while radially traversing the primary flow path.

The bearing that the exhaust casing supports is supplied by air coming from the secondary flow path while being conveyed by the arms of the exhaust casing. This air is used notably to cool the radial arms and to pressurise externally a lubrication housing in which is housed the bearing borne by this exhaust casing.

However, the casings surrounding the primary flow path bear on their outer faces elements such as fuel ramps, systems for controlling variable pitch blades or others. These elements jut out, such that they introduce significant head losses for the portion of secondary stream that runs along them and in which is collected the supply air traversing the radial arms of the exhaust casing.

On account of these head losses, the pressure at the level of the collection openings can prove to be insufficient to bring about a sufficient flow rate in the radial arms of the exhaust casing.

One solution could consist in collecting the air by means of a scoop radially extending beyond the casings surrounding the primary flow path, at the level of the radial arms, but such a scoop would introduce turbulences penalising for the flow of the secondary stream.

The aim of the invention is to provide an architecture making it possible to improve the air supply through the radial arms of the exhaust casing.

DESCRIPTION OF THE INVENTION

To this end, the subject matter of the invention is a double flow turbojet including:
  a low pressure compressor;
  a series of casings extending downstream of this low pressure compressor to delimit a primary flow path for circulating a primary stream, and including an upstream edge delimiting a circumferential inlet opening of this primary stream;
  a high pressure compressor situated in the primary flow path;
  a shroud surrounding the series of casings to delimit with this series of casings an intermediate flow path for circulating an intermediate stream, this shroud having an upstream edge surrounding the series of casings to delimit with this series of casings an inlet opening situated upstream of the high pressure compressor;
  a secondary flow path casing surrounding the intermediate shroud to delimit with this shroud a secondary flow path for circulating a secondary stream;
  an exhaust casing including an outer shell extending into the extension of the series of casings as well as radial arms coming from this outer shell, one at least of these radial arms collecting the air coming from the intermediate flow path to supply with pressurised air a central region of this exhaust casing.

With this arrangement, the pressure reigning at the inlet of the radial supply arms of the casing corresponds to the static pressure increased by the dynamic pressure at the outlet of the low pressure compressor, without the flow of the secondary stream being perturbed.

The subject matter of the invention is also a turbojet thereby defined, in which the air sucked in is divided at the level of an intermediate casing situated between the low pressure compressor and the high pressure compressor, to form the central primary stream, the intermediate stream, and the secondary stream.

The subject matter of the invention is also a turbojet thereby defined, in which the air supplied in the central region of the exhaust casing contributes to pressurising the seals of a lubrication housing in which is housed a bearing borne by this exhaust casing.

The subject matter of the invention is also a turbojet thereby defined, in which the air supplied in the central region of the exhaust casing supplies a purge situated upstream of the exhaust casing.

The subject matter of the invention is also a turbojet thereby defined, in which the radial arms of the exhaust casing comprise pierced jackets arranged so that the air traversing these radial arms cools the walls of these arms.

The subject matter of the invention is also a turbojet thereby defined, in which the inlet opening of the intermediate flow path is a circumferential opening surrounding the primary flow path.

The subject matter of the invention is also a turbojet thereby defined, in which the shroud joins the outer shell of the exhaust casing downstream of the radial arms of this exhaust casing.

DETAILED DESCRIPTION OF PARTICULAR EMBODIMENTS

The basic idea of the invention is to collect the air intended to transit via the radial arms of the exhaust casing, directly downstream of the low pressure compressor in order to benefit from the static pressure increased by the dynamic pressure downstream of the low pressure compressor.

Figure 1:
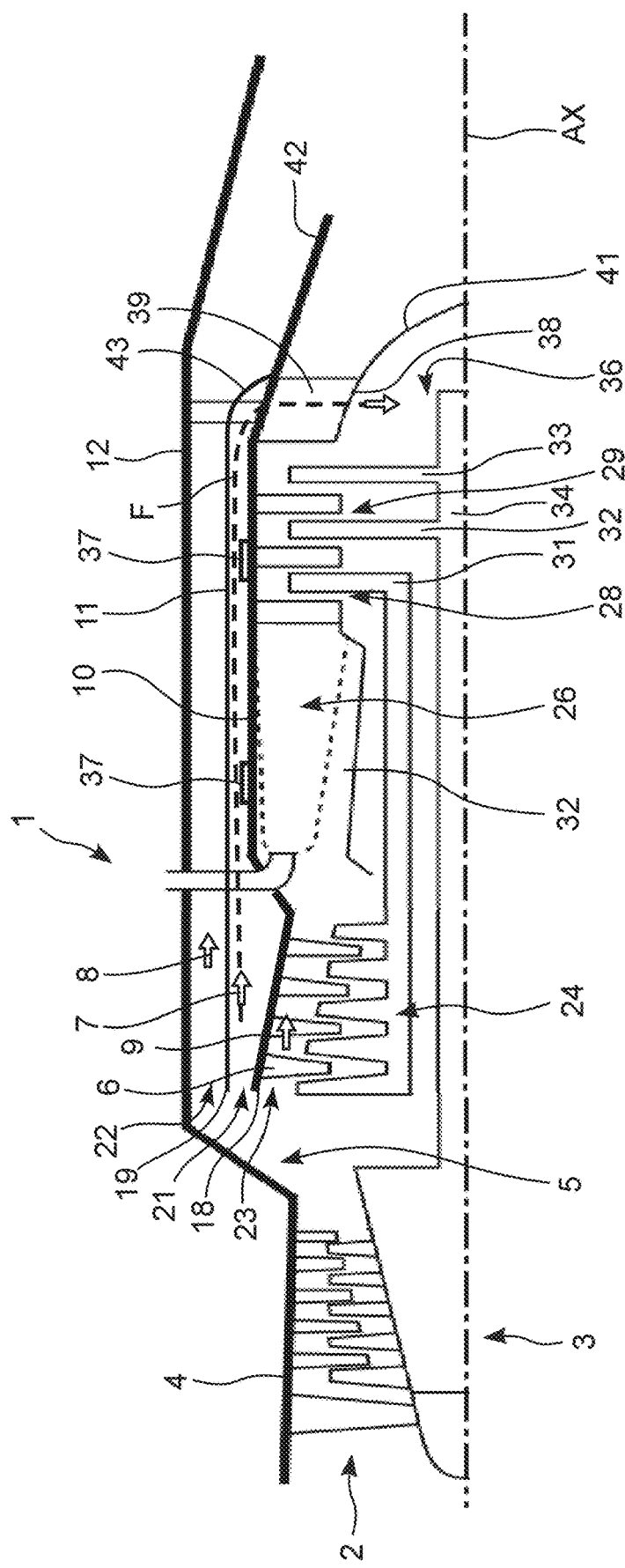
FIG. 1 is a schematic half-view along a longitudinal sectional plane of the engine according to the invention as a whole.

In FIG. 1, a double flow turbojet 1 comprises an inlet duct 2 in which the air is sucked in by the vanes of a low pressure compressor 3 surrounded by a low pressure compressor casing 4, to next be divided into three streams at the level of an intermediate casing 5 extending longitudinally between the low pressure compressor and a high pressure compressor. These three streams comprise a central primary stream 6, an intermediate stream 7 surrounding the primary stream, and a secondary stream 8 which surrounds the intermediate stream 7.

The primary stream 6 circulates in a primary flow path that is delimited internally by a succession of fixed inner elements and rotating inner elements. The fixed inner elements include platforms of straightening vanes and distributors, and inner casing shells, and the rotating inner elements include platforms of bladed wheels of rotors.

This primary flow path is delimited externally by a series of casings that surround it and which include a high pressure compressor casing 9, a casing surrounding the combustion chamber and a casing surrounding the high pressure turbine jointly marked by 10, as well as by an outer shell of the exhaust casing.

The intermediate stream circulates between, on the one hand, the series of casings delimiting the primary flow path and, on the other hand, an intermediate shroud 11 that surrounds them over the whole length thereof.

The secondary stream circulates in a secondary flow path delimited internally by the intermediate shroud 11 and externally by a secondary flow path casing 12 surrounding the intermediate shroud 11.

The intermediate casing 5 comprises an outer shell and an inner shell connected by radial arms, and it is situated between the low pressure compressor 3 and the high pressure compressor 24. Its outer shell connects the casing 4 of the low pressure compressor to the secondary flow path casing 12, and its inner shell and supports the bearings of these compressors.

An upstream circular edge 18 of the high pressure compressor outer casing, and an upstream circular edge 19 of the intermediate shroud 11 are situated at the level of this intermediate casing 5. The upstream circular edge 18 of the high pressure compressor casing delimits internally a circumferential inlet opening 23 of the primary flow path.

The upstream circular edge 19 of the shroud 11 delimits with the edge 18 a circumferential inlet opening 21 of the intermediate flow path, and it delimits with the secondary flow path casing 12 a circumferential inlet opening 22 of the secondary flow path. These inlet openings both have crown shapes and they both receive the air having undergone a low pressure compression and circulating in the intermediate casing 5.

The edges 18 and 19 may, if needs be, be formed directly in the intermediate casing in the form of corresponding lips extended respectively by the high pressure compressor casing and by the intermediate shroud 11.

Once past the intermediate casing 5, the primary stream 6 traverses a high pressure compressor 24 before reaching a combustion chamber 26 to be next expanded in a high pressure turbine 28 then in a low pressure turbine 29.

Figure 2:
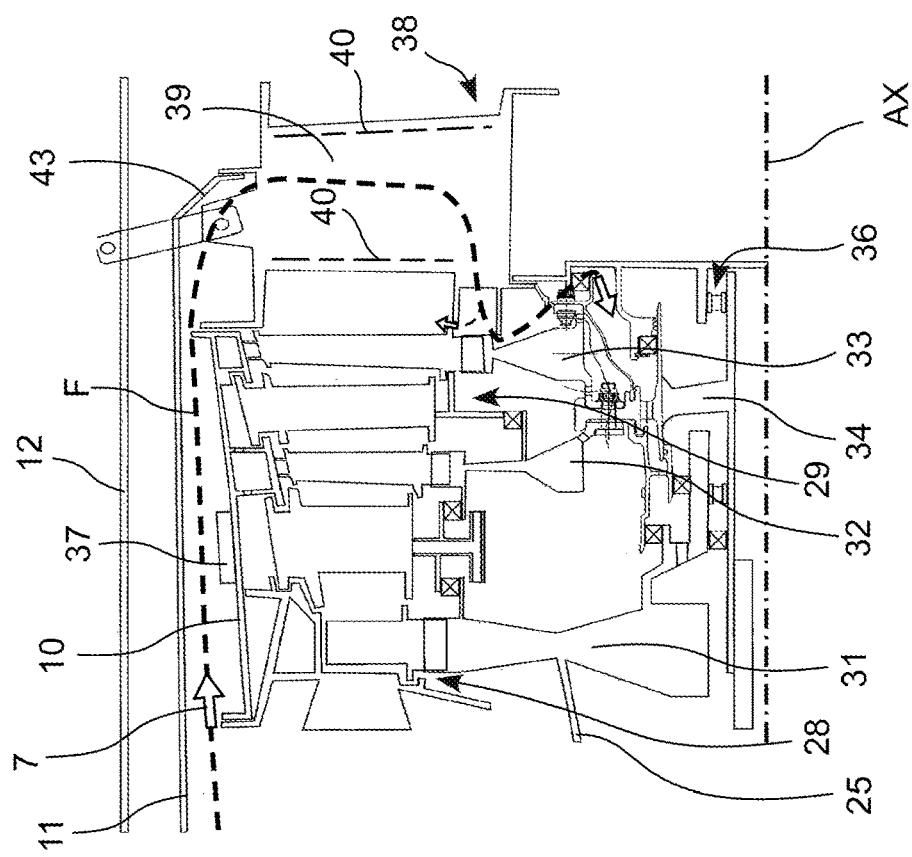
FIG. 2 is a half-view along a longitudinal sectional plane of a part of the engine according to the invention extending from its combustion chamber to its exhaust casing.

As is more clearly visible in FIG. 2, the high pressure turbine 28 comprises a disc 31 bearing corresponding blades, this disc being made integral with a high pressure body 25 extending upstream up to the compressor 24 of which this high pressure body 25 also bears the blades.

The low pressure turbine 29 comprises two discs 32, 33 bearing corresponding blades, and which are made integral with a low pressure trunnion 34 having a downstream end received in a bearing 36. This bearing 36 is situated in the central region of an exhaust casing 38 that surrounds it while ensuring the maintaining thereof.

This exhaust casing 38 comprises an inner shell and an outer shell which delimits externally the primary flow path, as well as radial arms 39 making these shells integral with each other. The outer shell extends into the continuity of the series of casings 9, 10 and the radial arms radially traverse the primary flow path, the assembly being situated downstream of the low pressure turbine 29.

This exhaust casing 38 furthermore bears an outlet cone 41 that is surrounded by a confluence wall 42, downstream of the low pressure turbine 29 and radial arms 39. This confluence wall which is fixed to a flange of the exhaust casing extends into the extension of the outer shell of the exhaust casing to guide the secondary stream so that it has the most regular possible flow, that is to say without perturbations.

One or more of the radial arms 39 is hollow, so as to convey into a central region of this exhaust casing 38 the air coming from the intermediate flow path to notably pressurise the seals of the lubrication housing of the bearing borne by this casing, along a path F represented in dotted lines in FIGS. 1 and 2.

The intermediate shroud 11 surrounds the series of casings delimiting externally the primary flow path from the intermediate casing corresponding to the outlet of the low pressure compression portion, up to the rear of the engine downstream of the radial arms 39. As may be seen notably in FIG. 1, the series of casings 9 and 10 bears on its outer face different items of equipment, such as flanges, fuel ramps, variable pitch blade control systems or others, marked by 37. The intermediate shroud 11 begins at the first item of equipment of the high pressure compressor.

In other words, the different items of equipment 37 are all situated in the intermediate flow path instead of being situated in the secondary flow path, such that they do not introduce head loss into the secondary flow path. Over its whole length, this shroud 11 surrounds the series of casings 9, 10 to delimit therewith an annular space for circulating the stream of air of the intermediate flow path.

This shroud 11 has a downstream end 43 situated after the radial arms 39 which narrows to join the outer shell of the exhaust casing such that the intermediate flow path is closed at its rear end.

This downstream end 43 has an annular conduit shape separating into several conical axial conduits. Each conical conduit ends in a bend oriented towards a radial arm 39 of the exhaust casing 38 to form a scoop.

The totality of the intermediate stream 7 is thereby extracted via the inner channel(s) of the different radial arms 39 to notably cool these arms. This air is more specifically intended to pressurise the seals of the lubrication housing of the bearing borne by this casing, and to supply a low pressure turbine purge.

Generally speaking, the pressure that reigns in the whole of the intermediate flow path corresponds to the total pressure at its inlet 21, that is to say to the static pressure of the air that has been compressed by the low pressure compressor 3 increased by the dynamic pressure. Indeed, the flow rate of the intermediate stream being relatively low, the head losses introduced by the elements 37 are decreased. In these conditions, the pressure reigning at the level of the inlet of the radial arms 39 is equal to the total pressure reigning at the inlet 21, that is to say the static pressure resulting from the compression delivered by the low pressure compressor increased by the dynamic pressure.

The invention thereby makes it possible, despite the presence of elements 37 extending beyond the outer face of the series of casings 9, 10, to maintain a sufficiently high pressure of the stream running along the outer face of this series of casings. In addition, it makes it possible to limit turbulences of the secondary stream which no longer runs along the irregularities that the elements 37 constitute.

Figure 3:
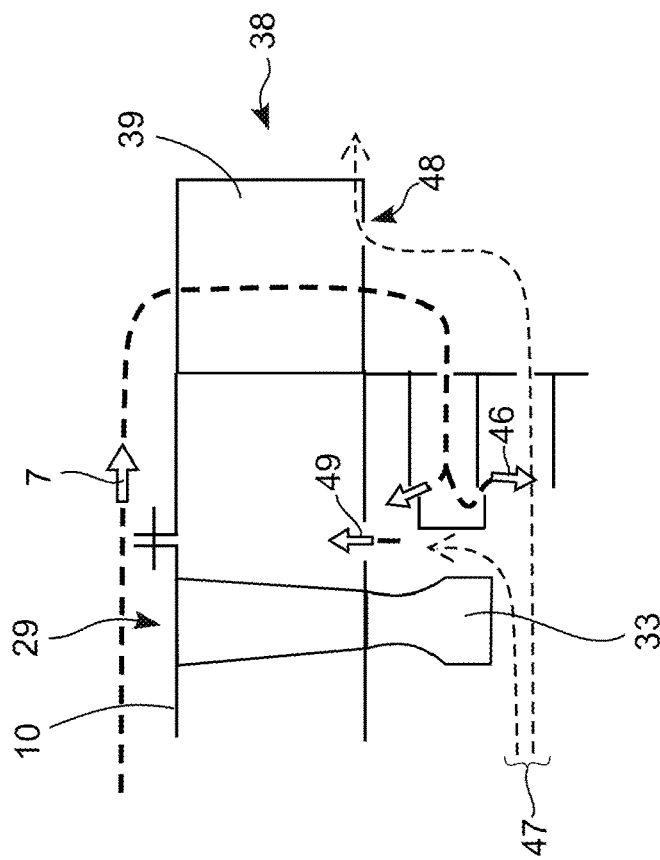
FIG. 3 is a schematic sectional half-view illustrating the progress of the air collected at the level of the exhaust casing in the engine according to the invention.

As represented schematically in FIG. 3, the intermediate stream 7 that transits via the radial arms of the exhaust casing cools these arms, pressurises the lubrication housing containing the bearing that this exhaust casing bears, and it also supplies a purge situated between the final rotating stage of the low pressure turbine and the exhaust casing.

To improve the cooling of the radial arms 39, said arms are equipped with pierced inner jackets 40 (schematically shown in FIG. 2) arranged to improve thermal convection along the walls of these arms.

As shown in FIG. 3, the stream 7 traverses the arms 39 of the casing to cool them, and a first part of the remaining air is directed towards the environment of the lubrication housing borne by the exhaust casing, to contribute to its pressurisation, which is represented by the arrow 46.

The air coming from the stream 7, completed by another pressurisation air 47, coming from upstream of the low pressure turbine, is furthermore re-introduced into the primary flow path while traversing a passage 48 formed in the inner shell of the exhaust casing 38.

A second part of the remaining air is directed towards the purge 49 situated between the final low pressure turbine stage and the exhaust casing 38. The purge 49 is completed by the air 47 coming from upstream of the turbine.

Furthermore, the intermediate stream may also be exploited to cool a high pressure turbine casing in order to reduce the play existing between the ends of the vanes of the high pressure turbine and this casing.

What is claimed is:

1. A double flow turbojet including:
   a low pressure compressor;
   a series of casings extending downstream of this low pressure compressor to delimit a primary flow path for circulating a primary stream, and including an upstream edge located downstream of the low pressure compressor and delimiting a circumferential inlet opening for the primary stream;
   a high pressure compressor situated in the primary flow path;
   a shroud surrounding the series of casings to delimit with this series of casings an intermediate flow path for circulating an intermediate stream, this shroud having an upstream edge surrounding the series of casings to delimit with this series of casings an inlet opening situated upstream of the high pressure compressor;
   a secondary flow path casing surrounding the shroud to delimit with this shroud a secondary flow path for circulating a secondary stream;
   an exhaust casing including an outer shell extending into an extension of the series of casings as well as radial arms coming from this outer shell, one at least of these radial arms collecting air coming from the intermediate flow path to supply with pressured air a central region of this exhaust casing,
   wherein air sucked into the turbojet is divided at a level of an intermediate casing situated between the low pressure compressor and the high pressure compressor, to form the primary stream, the intermediate stream, and the secondary stream.

2. The turbojet according to claim 1, in which the air supplied in the central region of the exhaust casing contributes to pressurising seals of a lubrication housing in which is housed a bearing borne by this exhaust casing.

3. The turbojet according to claim 1, in which the air supplied in the central region of the exhaust casing supplies a purge situated upstream of the exhaust casing.

4. The turbojet according to claim 1, in which the radial arms of the exhaust casing comprise pierced jackets arranged so that the air traversing these radial arms cools walls of these arms.

5. The turbojet according to claim 1, in which the inlet opening of the intermediate flow path is a circumferential opening surrounding the primary flow path.

6. The turbojet according to claim 1, in which the shroud joins the outer shell of the exhaust casing downstream of the radial arms of this exhaust casing.

* * * * *